L. McKINNON.
TIRE FILLER.
APPLICATION FILED AUG. 27, 1917.
1,265,466.
Patented May 7, 1918.
2 SHEETS—SHEET 1.
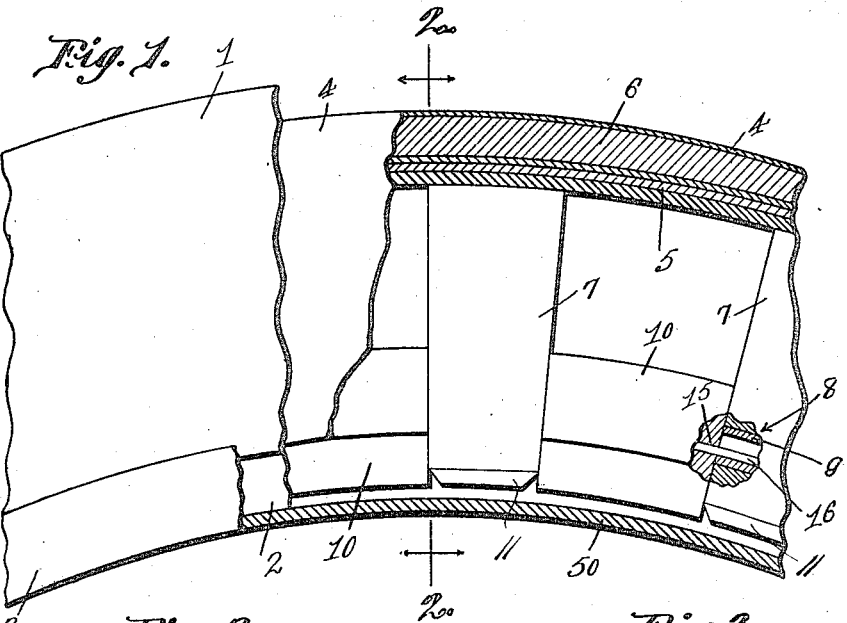
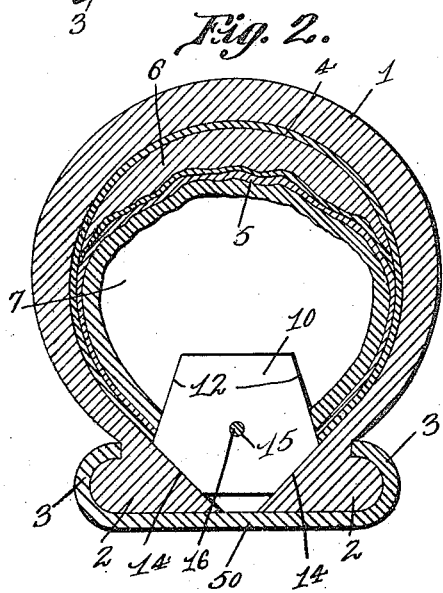
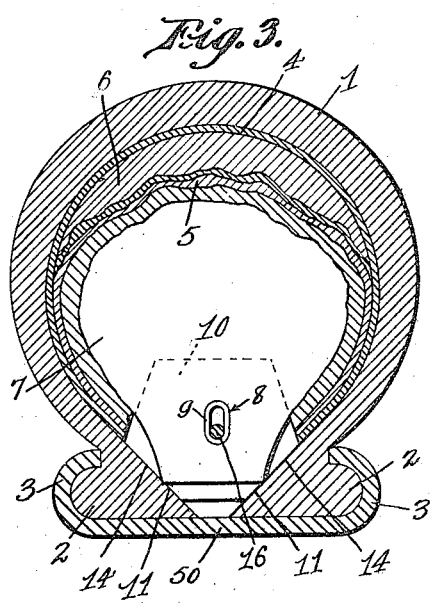
Witness
Inventor
L. McKinnon
By C. A. Snow & Co.
Attorney

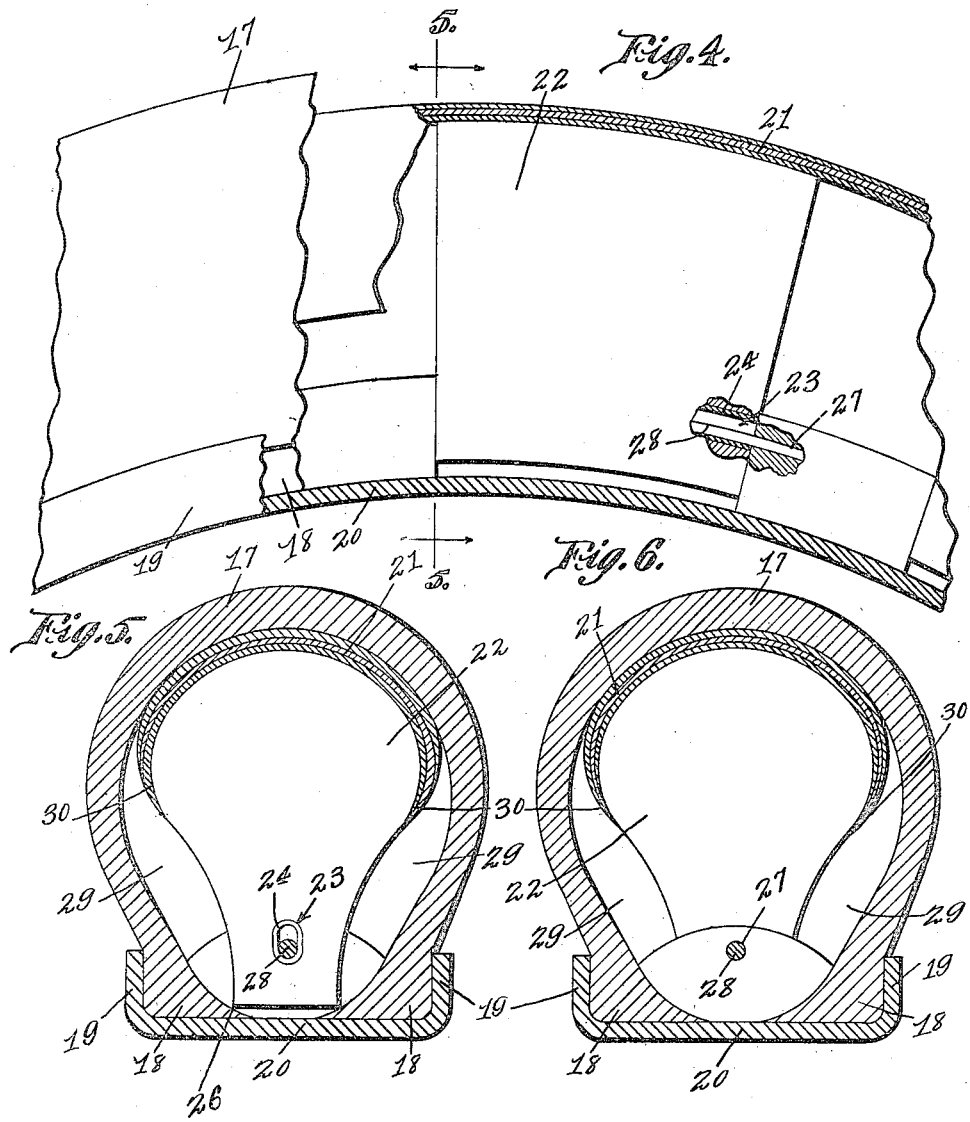

UNITED STATES PATENT OFFICE.

LEMUEL McKINNON, OF SALT LAKE CITY, UTAH.

TIRE-FILLER.

1,265,466.  Specification of Letters Patent.  Patented May 7, 1918.

Application filed August 27, 1917. Serial No. 188,417.

*To all whom it may concern:*

Be it known that I, LEMUEL MCKINNON, a citizen of the United States, residing at Salt Lake City, in the county of Salt Lake and State of Utah, have invented a new and useful Tire-Filler, of which the following is a specification.

The device forming the subject matter of this application is a vehicle tire, and the invention aims, particularly, to improve the construction of the filler which constitutes a part of the tire.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 is a side elevation, showing a device constructed in accordance with the present invention, parts being broken away;

Figs. 2 and 3 are sections taken on the line 2—2 of Fig. 1, looking in opposite directions;

Fig. 4 is a side elevation showing a slightly modified form of the invention, parts being broken away;

Figs. 5 and 6 are sections taken on the line 5—5 of Fig. 4, looking in opposite directions.

Referring to that form of the invention which is disclosed in Fig. 1, there appears a tire casing 1 having beads 2 engaged by the flanges 3 of a rim 50, although it is to be understood that the casing may be assembled with the rim in any desired manner.

Disposed within the casing 1 is a filler comprising a circumferential band including an outer layer 4, any desired number of inner layers 5, and a tread 6 disposed between the outer layer 4 and one of the inner layers 5. The layers 5 and 4 may be made of canvas, the tread 6 being fashioned from a resilient composition, if desired. Disposed within the band above defined and secured thereto are resilient blocks 7 which may be made of rubber, the blocks 7 being spaced from each other circumferentially of the tire. The blocks 7 are provided with openings 8 which are elongated in the direction parallel to the median plane of the wheel. Reinforcing thimbles 9 are secured in the openings 8. The blocks 7 have beveled sides 11 engaging the inner surfaces of the beads 2.

Disposed between the blocks 7 and abutting terminally thereagainst are spacing blocks 10 which may be made of wood or any other suitable material. The spacing blocks 10 preferably are of hexagonal form and include inclined sides 12 engaging the longitudinal edges of the filler band above described. The blocks 10 include, also, sides 14 which bear on the inner surfaces of the beads 2. In the filler blocks 10, openings 15 are fashioned. These openings are not elongated, like the openings 8 in the blocks 7. Through the openings 15 and 8 is extended a circumferential securing member 16 adapted to be tightened in any suitable way. I have shown no tightening means for the member 16, because I am aware of the fact that a tightening means cannot be claimed in this application.

A device constructed in accordance with the foregoing description, will be found to possess great resiliency, combined with the necessary stability.

The thimbles 9 prevent the blocks 7 from being worn or cut in two by the securing member 16, and since the openings 8 are elongated in a direction parallel to the median plane of the wheel, a compression of the resilient blocks 17 will be facilitated.

In the modification shown in Figs. 4, 5 and 6, the casing appears at 17 and is provided with beads 18 engaging the flanges 19 of a rim 20.

The filler comprises a band 21 made up of any desired number of layers of canvas or other suitable material. To the band 21 are attached resilient blocks 22 which may be made out of rubber, the blocks being supported as shown at 26 on the beads 18. The blocks 22 have openings 23 which are elongated in a direction parallel to the median plane of the wheel. Protecting or reinforcing thimbles 24 are secured in the openings 23. Disposed between the blocks 22 and abutting terminally thereagainst are spacers 25 which, in cross section, preferably are lens-shaped, to conform to the inner surfaces of the beads 18, whereon the spacers are supported. The spacers 25 are provided with openings 27, but these openings are not elongated like the openings 23 in the resilient blocks 22. Through the openings 27 and 23 is passed a securing member 28 of circumferential form.

In the modification last above described, a considerable space, indicated at 29, exists between the lateral edges of the resilient blocks 22 and the casing 17. Further, as indicated at 30, the band to which the blocks 22 are secured, terminate at a greater distance from the rim 20 than is the case in the form of the invention shown in Figs. 1, 2 and 3.

Having thus described the invention, what is claimed is:—

1. In a wheel of the class described, a rim; a casing carried thereby; a filler in the casing and comprising a transversely arched tread band; circumferentially spaced resilient blocks carried by the band and having openings which are elongated in a direction parallel to the median plane of the wheel; reinforcing thimbles mounted in the openings and conforming internally to the shape thereof; spacers interposed between the blocks and supported upon their inner sides by the longitudinal edges of the casing; and a circumferential securing member extended through the thimbles and having movement therein parallel to the median plane of the wheel, the securing member passing through the spacers.

2. In a device of the class described, a rim; a casing carried thereby; a filler in the casing and comprising a transversely arched tread band; circumferentially spaced resilient blocks carried by the band; spacers disposed between the blocks, the spacers having relatively inclined sides, engaged, respectively, with the edges of the band and with the casing; and a tightening device passing through the blocks and the spacers.

In testimony that I claim the foregoing as my own, I have hereto affixed my signature in the presence of two witnesses.

LEMUEL McKINNON.

Witnesses:
 EDNA SULLIVAN,
 G. C. RICHTER.

Copies of this patent may be obtained for five cents each, by addressing the "Commissioner of Patents, Washington, D. C."